US006988971B2

(12) United States Patent
Konno

(10) Patent No.: US 6,988,971 B2
(45) Date of Patent: Jan. 24, 2006

(54) TENSIONER LEVER

(75) Inventor: Masahiko Konno, Osaka (JP)

(73) Assignee: Tsubakimoto Chain Co., Osaka (JP)

(*) Notice: Subject to any disclaimer, the term of this patent is extended or adjusted under 35 U.S.C. 154(b) by 135 days.

(21) Appl. No.: 10/647,637

(22) Filed: Aug. 25, 2003

(65) Prior Publication Data

US 2004/0058762 A1 Mar. 25, 2004

(30) Foreign Application Priority Data

Sep. 25, 2002 (JP) ............................ 2002-278977

(51) Int. Cl.
*F16H 7/08* (2006.01)
*F16H 7/18* (2006.01)

(52) U.S. Cl. ...................................... 474/111; 474/140

(58) Field of Classification Search ................ 474/111, 474/140; 428/43, 517, 520

See application file for complete search history.

(56) References Cited

U.S. PATENT DOCUMENTS 5,092,446 A * 3/1992 Sullivan et al. ............. 198/323
5,318,482 A * 6/1994 Sato et al. .................. 474/111
6,890,277 B2 * 5/2005 Inoue et al. ................ 474/111

FOREIGN PATENT DOCUMENTS

| | | | |
|---|---|---|---|
| EP | 1 267 097 A1 | 12/2002 | |
| EP | 1 291 553 A2 | 3/2003 | |
| FR | 2 736 123 A1 | 6/1996 | |
| JP | 01-141145 A * | 6/1989 | ................. 280/751 |
| JP | 2540896 | 4/1997 | |
| JP | 10-213192 A * | 8/1998 | |
| JP | 2001-323976 | 11/2001 | |

* cited by examiner

*Primary Examiner*—Marcus Charles
(74) *Attorney, Agent, or Firm*—Howson and Howson

(57) ABSTRACT

A slide rail and a rail support are integrally formed from a high-strength first polymer resin. A wear-resistant second polymer resin, applied to the slide rail and rail support in the process of sandwich molding, entirely covers the slide rail and rail support, including the inner circumferential surface of a pivoting hole in the rail support, and an engine block-engaging seating surface of a boss surrounding the pivoting hole. The tensioner lever exhibits excellent mechanical strength and wear resistance, low weight and reduced production cost, and can be recycled easily. The covering of wear-resistant polymer particularly prevents wear on the inner circumferential surface of the pivoting hole and the seating surface of the boss.

1 Claim, 3 Drawing Sheets

TENSIONER LEVER

FIELD OF THE INVENTION

This invention relates generally to transmission devices incorporating an endless, flexible, power transmission medium such as a roller chain, silent chain or the like, which travels in engagement with a driving sprocket and one or more driven sprockets. Such transmission devices are used, for example, in the valve timing apparatus of an automobile engine. The invention relates more particularly to a tensioner lever, which maintains tension in an endless, flexible, transmission medium while in sliding contact with the transmission medium.

BACKGROUND OF THE INVENTION

A tensioner lever is generally mounted, by means of a mounting bolt or pin, on an engine block or other frame, in the vicinity of a tensioner which cooperates with the lever. The tensioner lever, in cooperation with the tensioner, maintains appropriate tension in the transmission medium to prevent transmission failure due to excess tension and excess loosening of the transmission medium.

In one well-known example of a conventional tensioner lever, described in Japanese Laid-open Patent Publication No. 2001-323976 (pages 1 to 4, FIG. 2), a sliding contact portion extending along the traveling plane of the chain, and a reinforcing body, which reinforces the sliding contact portion, are fused together. In another example of a conventional tensioner lever, described in Japanese Utility Model Registration Publication No. 2540896 (pages 1 to 3, FIG. 1), the lever includes a resin shoe for sliding contact with the transmission chain, and an aluminum arm for supporting the resin shoe.

In the first of the above two conventional chain levers, the reinforcing body is strengthened by glass fibers. As the reinforcing body continues to pivot about a pivoting shaft on an internal combustion engine, the internal surface of its mounting hole is subject to wear, and the glass fibers are exposed and crushed. The crushed glass fibers act as an abrasive, causing accelerated wear and damage to the mounting hole of the reinforcing body and the pivoting shaft. In the case of a lever incorporating an aluminum arm, the continued pivoting of the lever about a pivoting shaft on an engine causes the arm to be burned and thereby also subjected to wear and damage. The use of a bushing or the like, fitted to the pivoting hole, has been considered to avoid the problem of wear. However, this measure increases the number of parts, the difficulty of assembly, and the production cost. Moreover, in the case of an aluminum arm, recycling of a spent lever is troublesome because the resin shoe, the aluminum arm, and a resin pad, must be separated before disposal.

Accordingly, the objects of the invention are to solve the above-described problems, and to provide a tensioner lever having excellent mechanical strength and wear resistance, reduced production cost, reduced weight, and ease of recycling. A particular object of the invention is to reduce wear on the inner circumferential surface and the boss portion of the pivoting hole by which the lever is mounted on the engine block.

SUMMARY OF THE INVENTION

The tensioner lever in accordance with the invention comprises an elongated slide rail for sliding engagement with a traveling, endless, flexible, transmission medium extending along the direction of elongation of the slide rail, and a rail support, extending along the direction of elongation of the slide rail, and supporting the slide rail. The rail support has a pivoting hole for mounting on a pivot shaft extending from an engine block, and a boss portion surrounding the pivoting hole and having a seating surface for engagement with the engine block. The slide rail and rail support are integrally formed of a high-strength first polymer resin. The elongated slide rail and the rail support, including the inner circumferential surface of the pivoting hole and the seating surface of the boss portion, are entirely covered by a covering composed of a wear-resistant second polymer resin. The slide rail, the rail support, and the covering are sandwich molded.

The term "sandwich molded" as used herein refers to a molded product composed of two kinds of polymer resin, formed by simultaneous, or substantially simultaneous injection-molding of the two kinds of polymer resin in a mold conforming to the outer shape of the molded product. Thus, the molded product is a two-layer molded product composed of a skin and a core. The tensioner lever in accordance with the invention can be produced using a known sandwich molding, injection-molding machine.

Although the known sandwich molding injection-molding machines are provided with various sandwich nozzles, a parallel type sandwich nozzle utilizing a torpedo (that is an injection switching member for switching between a skin polymer resin and a core polymer resin) is preferred for producing the guide in accordance with the invention. The torpedo is moved forward or backward so that the injection rate can be accurately controlled in accordance with the shape of the molded product.

The injection rate can determine the strength of the guide. For example, the strength of the guide can be improved by decreasing the thickness of the skin layer and increasing the volume of the core layer.

Preferably, the first and second polymer resins, have chemical affinity and similar shrink characteristics, because they are fused to each other in the process of sandwich molding.

Specifically, for example, a combination of a glass fiber-reinforced polyamide 66 resin as the first polymer resin, and a polyamide 66 resin or a polyamide 46 resin as the second polymer resin, is preferred.

Since the slide rail and support are integrally joined to each other in a fully fused condition, the tensioner lever in accordance with the invention exhibits durability superior to that attainable in a conventional tensioner lever where the slide rail and support are mechanically joined.

Moreover, since the entire outer surface of the integrally joined slide rail and rail support is covered with a wear-resistant second polymer resin, the tensioner lever exhibits superior wear-resistance and can remain in sliding contacts with a traveling transmission chain over a long period of time. The covering also serves as a reinforcing skin layer, for reinforcing the integrally formed slide rail and the rail support.

Additionally, since the inner circumferential surface of the pivoting hole and the seating surface of the boss portion, are entirely covered with the wear-resistant polymer resin, the self-lubricating function of the wear-resistant polymer allows the lever to pivot smoothly while pivoted on a pivot shaft extending from an engine block.

DETAILED DESCRIPTION OF THE PREFERRED EMBODIMENTS

One example of preferred embodiments of a tensioner lever according to the invention will be described below with reference to the drawings.

Figure 1:
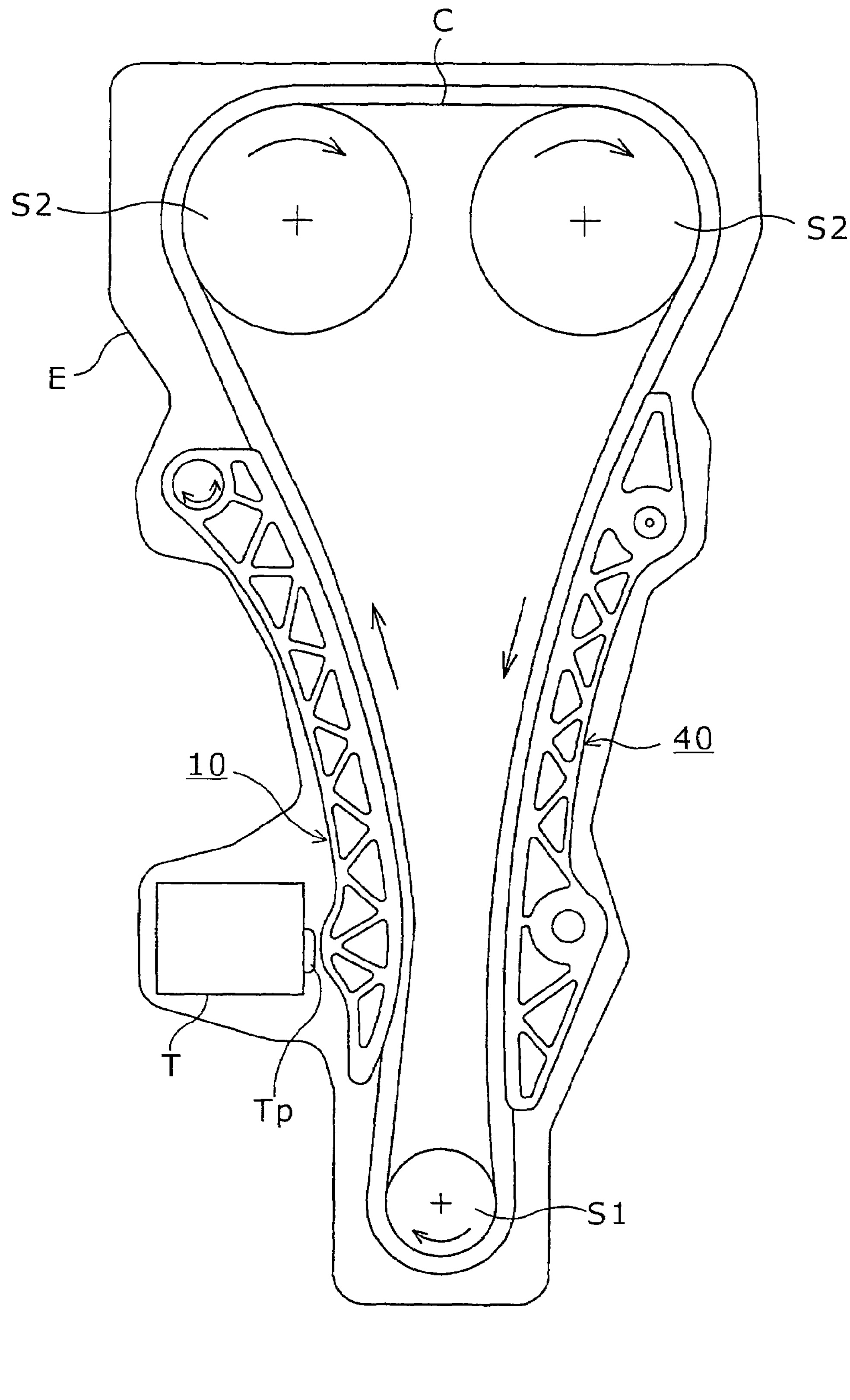
FIG. 1 is an elevational view of the timing transmission of an internal combustion engine, illustrating a typical application for a tensioner lever in accordance with the invention.

As shown in FIG. 1, a tensioner lever 10 is used in the timing transmission of an engine, in which a chain C transmits power from a driving sprocket S1 to a pair of driven sprockets S2. As seen in FIG. 1, the chain C is in sliding contact with the lever 10.

Figure 2:
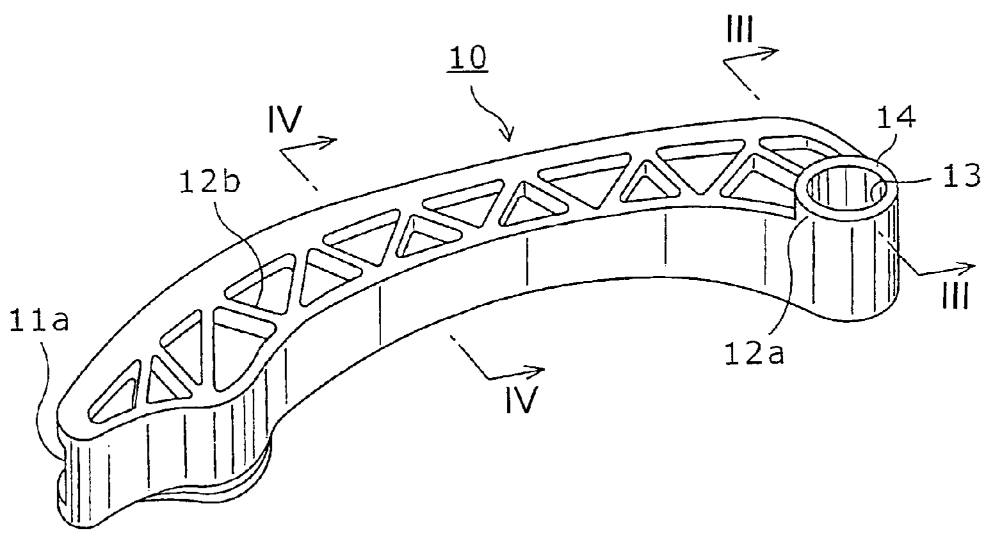
FIG. 2 is a perspective view of a tensioner lever in accordance with the invention.

As shown in FIG. 2, the tensioner lever 10 comprises a slide rail, which has an arc-shaped sliding contact surface 11*a*, arranged along the direction of travel of the transmission chain C. The lever also comprises a rail support extending along the longitudinal direction of the slide rail on the side opposite to surface 11*a*. The rail support includes a boss portion 12*a*, having a pivoting hole 13 for pivotal mounting of the lever on a shaft extending from the wall of an engine block. Ribs 12*b*, formed in the rail support serve both a reinforcing function and weight reducing function.

Figure 3:
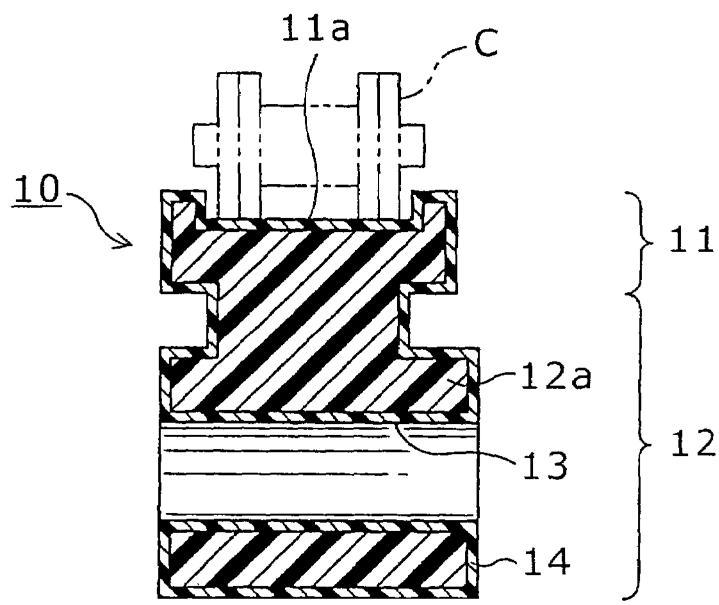
FIG. 3 is an enlarged cross-sectional view taken on plane III—III in FIG. 2.
Figure 4:
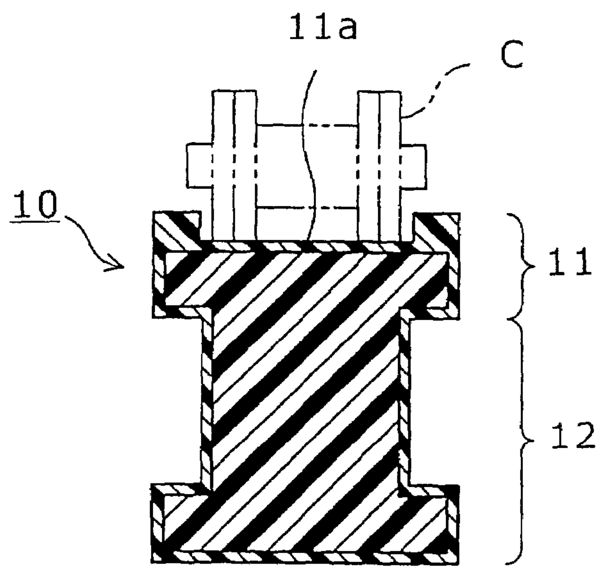
FIG. 4 is an enlarged cross-sectional view taken on plane IV—IV in FIG. 2.

As shown in FIGS. 3 and 4, a first high strength polymer resin forms the core of the slide rail 11 and the rail support 12. The two portions of the core are fully fused together so that the strength required in the high temperature environment of an automobile engine can be maintained at a high level over a long period of time.

Any polyamide resin, such as polyamide 46 resin, aromatic polyamide resin or the like, or glass-reinforced polyamide 66 resin, which can exhibit high strength over a long period of time, can be used as the first polymer resin. Glass fiber-reinforced polyamide 66 resin is the most suitable for use as the first polymer resin.

A second, high strength, polymer resin, preferably polyamide 66 resin, is used as the outer surface of the integrally formed core layer of the slide rail 11 and the rail support 12, the inner circumferential surface of the pivoting hole 13 and the end surface 14 of the boss portion 12*a*, which serves as a seating surface for engagement with the wall of the engine block. This second polymer resin is in sliding contact with the transmission chain C over a long period of time, and is required to have good wear resistance. In addition, the second polymer resin improves the durability of the lever by integrally encasing its core layer in a skin which reinforces the strength of the slide rail 11 and the rail support 12.

Although polyamide 66 resin is preferred as the second polymer resin any polyamide resin having good wear resistance when in sliding contact with a chain, for example polyamide 46, can be used.

The lever structure in accordance with the invention is produced by sandwich molding.

First, a polyamide 66 resin is injected from a sandwich nozzle of a sandwich molding injection molding machine into a single and simple mold conforming to the outer shape of the lever to be produced. The injection of the polyamide 66 resin starts the molding of the skin layer of wear-resistant, second polymer resin over the entire outer shape of the lever including the slide rail 11 and a rail supporting portion 12. The skin layer, which is formed by the injection of the polyamide 66 resin, covers the outer surface of the integrally formed slide rail 11 and rail support 12, as well as the inner circumferential surface of the pivoting hole 13 and the seating surface 14 on the end of the boss 12*a*.

At the same time, or substantially at the same time, as the start of injection of the skin layer, glass fiber-reinforced polyamide 66 resin is injected to form the slide rail 11 and the rail support 12 as a high strength core. After the mold is cooled, the molded lever is removed from the mold, thereby completing the molding cycle.

Since the outer surface of the integrally formed slide rail 11 and rail support 12, are entirely covered by the skin layer, the rail 11 and the rail support 12 are more strongly joined to each other. Additionally, the inner circumferential surface of the pivoting hole 13 and the seating surface 14 of the boss are covered by the wear-resistant second polymer resin. Thus, the tensioner lever exerts a self-lubricating function so that it pivots smoothly slide on the engine block.

Furthermore, since the entire tensioner lever 10 is composed of a polymer resin, the overall weight of the lever is reduced compared to a conventional lever incorporating a metal reinforcement, and the lever can be recycled without disassembly.

The advantages of the invention may be summarized as follows.

First, the slide rail a rail support are integrally sandwich-molded from high-strength first polymer resin in a fully fused condition, in a simple mold. Thus assembly and integration of the slide rail and the rail support are performed simultaneously, or substantially simultaneously, in a single step.

The tensioner lever in accordance with the invention exhibits excellent durability, compared to that of a conventional tensioner lever formed by a resin shoe and an aluminum arm. The tensioner lever can be produced in a molding cycle of short duration. It can be produced at a reduced production cost by simplifying complicated production steps, and can also be made lighter in weight than a conventional lever.

The outer surface of the integrally formed slide rail and rail support, the inner circumferential surface of the pivoting hole and the seating surface of the boss surrounding the pivoting hole are entirely covered by a wear resistant second polymer resin. Thus, the tensioner lever in accordance with the invention can be in sliding contact with a traveling transmission chain over a long period of time while exhibiting a high degree of wear resistance. Additionally, the slide rail and the rail support, which are integrally formed from a first polymer resin, are reinforced by a skin layer composed of the second polymer resin, which covers the entire outer surface of the lever. Therefore the tensioner lever in accordance with the invention exhibits excellent durability. Additionally, the inner circumferential surface of the pivoting hole, and the seating surface of the boss surrounding the pivoting hole, are entirely covered by the wear resistant second polymer resin. Thus, the tensioner lever exhibits a self-lubricating function by virtue of the lubricating quality of the second polymer resin, and thereby smoothly pivots on the engine block.

Furthermore, according to the invention, by using a sandwich molding process, in which two kinds of polymer resins are simultaneously or substantially simultaneously injected so that they are integrally and fully fused with each other, the two polymer resins can be, and preferably are, different from each other, being selected with reference to wear resistance, high strength properties under high temperature environmental conditions, and sliding properties relative to a transmission medium such as a roller chain or a silent chain. Finally, since the entire tensioner lever is composed of polymer resins, recycling can be carried out without disassembly and separation of parts of the lever after its removal from the transmission device.

What is claimed is:

1. A tensioner lever comprising:

an elongated slide rail for sliding engagement with a traveling, endless, flexible, transmission medium extending along the direction of elongation of the slide rail; and a rail support extending along the direction of elongation of the slide rail and supporting the slide rail;

wherein said rail support has a pivoting hole for mounting on a pivot shaft extending from an engine block, said pivoting hole having an inner circumferential surface, and a boss portion surrounding said pivoting hole, said boss portion having a seating surface for engagement with an engine block;

wherein the elongated slide rail and the rail support have a unitary core, formed of a high-strength, glass fiber-reinforced, polyamide 66 resin;

wherein said unitary core of the elongated slide rail and the rail support is entirely covered by a wear-resistant covering composed of a polyamide 66 resin;

wherein parts of said wear-resistant covering form the inner circumferential surface of said pivoting hole and said seating surface of said boss portion; and wherein said covering, and the unitary core of said elongated slide rail and said rail support, are sandwich molded.

* * * * *